United States Patent
Bass et al.

(10) Patent No.: US 11,718,795 B2
(45) Date of Patent: *Aug. 8, 2023

(54) METHOD OF MANUFACTURING RENEWABLE DIESEL FROM BIOLOGICAL FEEDSTOCK

(71) Applicant: Green Carbon Development, LLC, Houston, TX (US)

(72) Inventors: Thomas Bass, Mandeville, LA (US); James Rolston, Friendswood, TX (US); Terry Sparkman, Beaumont, TX (US)

(73) Assignee: Green Carbon Development, LLC, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/557,329

(22) Filed: Dec. 21, 2021

(65) Prior Publication Data

US 2022/0195313 A1    Jun. 23, 2022

Related U.S. Application Data

(60) Provisional application No. 63/282,804, filed on Nov. 24, 2021, provisional application No. 63/128,526, filed on Dec. 21, 2020.

(51) Int. Cl.
*C10G 3/00* (2006.01)
*C11C 1/04* (2006.01)
*C11C 1/10* (2006.01)
*C10G 45/60* (2006.01)
*C10G 45/08* (2006.01)

(52) U.S. Cl.
CPC .................. *C10G 3/50* (2013.01); *C10G 3/46* (2013.01); *C10G 45/08* (2013.01); *C10G 45/60* (2013.01);

(Continued)

(58) Field of Classification Search
CPC . C10G 3/46; C10G 3/50; C10G 45/08; C10G 45/60; C10G 2300/1014;

(Continued)

(56) References Cited

U.S. PATENT DOCUMENTS 2,139,589 A * 12/1938 Ittner ........................ C11C 1/04
                                                            554/160
2,190,616 A    2/1940 Thurman (Continued)

OTHER PUBLICATIONS

Snare et al: "Heterogeneous Catalytic Deoxygenation of Stearic Acid for Production of Biodiesel", Industrial Engineering Chemistry Research, 2006, vol. 45, 5708-5715.

(Continued)

*Primary Examiner* — In Suk C Bullock
*Assistant Examiner* — Jason Y Chong
(74) *Attorney, Agent, or Firm* — Conley Rose, P.C.

(57) ABSTRACT

A system and method for renewable diesel synthesis utilizes a triglyceride feedstock derived from biological sources. The first step involves hydrolysis of the triglycerides into an intermediate feedstock comprising a mixture of free fatty acids and glycerol (separated from the FFA by decantation and then distilled). The FFA is then further processed in a distillation step to produce a stream free of catalyst poisons and utilized as feedstock for hydrotreatment in a renewable diesel production process. By converting the initial triglyceride feedstock to an FFA feedstock, the need to hydrotreat at typical high temperature that promote the decarboxylation reaction is obviated, thereby reducing the production of $CO_2$, generating a significantly higher proportion of saturated, long chain C14, C16 or C18 hydrocarbons (as opposed to short-chain carbons such as propane), and the more valuable glycerol product is secured.

11 Claims, 3 Drawing Sheets

(52) U.S. Cl.
CPC .................. *C11C 1/04* (2013.01); *C11C 1/10* (2013.01); *C10G 2300/1014* (2013.01); *C10G 2300/1018* (2013.01); *C10G 2300/202* (2013.01); *C10G 2300/4006* (2013.01); *C10G 2300/4012* (2013.01); *C10G 2300/4081* (2013.01); *C10G 2400/04* (2013.01)

(58) Field of Classification Search
CPC ...... C10G 2300/1018; C10G 2300/202; C10G 2300/4006; C10G 2300/4012; C10G 2300/4081; C10G 2400/04; C11C 1/04; C11C 1/10; C10L 1/026; Y02E 50/10; Y02P 30/20
See application file for complete search history.

(56) References Cited

U.S. PATENT DOCUMENTS

| | | |
|---|---|---|
| 2,221,799 A | 11/1940 | Ittner |
| 2,458,170 A | 1/1949 | Ittner |
| 2,664,430 A | 12/1953 | Reinish et al. |
| 7,511,181 B2 | 3/2009 | Petri et al. |
| 7,967,973 B2 | 6/2011 | Myllyoja et al. |
| 8,350,102 B2 | 1/2013 | Roberts, IV et al. |
| 8,426,665 B2 | 4/2013 | Palauschek et al. |
| 8,912,375 B2 | 12/2014 | Egeberg et al. |
| 10,071,322 B2 | 9/2018 | Coppola et al. |
| 2013/0310620 A1* | 11/2013 | Kaines ..................... C10G 3/47 585/733 |
| 2018/0346831 A1* | 12/2018 | Sutterlin ................. C11C 3/003 |
| 2021/0004757 A1 | 2/2021 | Zarli |
| 2021/0047575 A1 | 2/2021 | Zarli |

OTHER PUBLICATIONS

Glycerine: an overview, 1990, The Soap and Detergent Association.
Archuleta: "Non-catalytic steam hydrolysis of fats and oils", Montana State University, 1991.
Bizzari et al: "Glycerin", Chemical Economics Handbook—SRI Consulting, Dec. 2008.

* cited by examiner

METHOD OF MANUFACTURING RENEWABLE DIESEL FROM BIOLOGICAL FEEDSTOCK

REFERENCE TO RELATED APPLICATIONS

This is a utility patent application claiming priority to provisional applications 63/128,526, filed 21 Dec. 2020, and 63/282,804, filed 24 Nov. 2021, with the same title and inventors. The contents of the above-referenced applications are incorporated herein by reference.

FIELD

Embodiments usable within the scope of the present disclosure relate, generally, to a novel method of synthesizing renewable diesel from natural triglycerides contained in plant oils and animal fats.

BACKGROUND

Renewable diesel is a biologically-derived method of synthesizing chemically equivalent hydrocarbon products (e.g., C10-C18 alkanes, naphtha) from present day biological sources such as animal fats. Unlike blended formulations such as bio-diesel, renewable diesel can fully substitute for petroleum-based hydrocarbons after the point of refinement.

Currently, renewable diesel manufacturing relies on the use of various catalysts for converting the triglycerides into usable fuel. Examples of common catalysts include oxides of Group I and Group II metals for ketonization, and Group VIa and Group VIII metals for deoxygenation. These catalysts are in turn vulnerable to various "catalyst poisons" commonly present in the triglycerides, which will inhibit the desired catalysis reactions. Examples of common catalyst poisons include sulfur, nitrogen and phosphorous.

In order to eliminate these catalyst poisons, triglycerides are subjected to a pre-treatment before use as a feedstock. The traditional pre-treatment step involves bleaching earth to remove catalyst poisons. This step adds expense due to the mining and use of large volumes of earthen clay material, and subsequent disposal of those materials once those catalyst poisons have been removed. The process also results in a significant (2-5 wt %) net loss of feedstock through absorption, which reduces the economy of renewable diesel compared to standard hydrocarbons.

In addition, once the triglycerides are treated, the standard renewable diesel process of decarboxylation produces two undesirable byproducts: propane and COD, which are of low value compared to the long-chain hydrocarbons and are usually used as a fuel within the manufacturing process or discarded, which further reduces the economy of renewable diesel, as such waste products must be disposed of and obviate the environmental benefits of renewable diesel.

Examples (all of which listed are incorporated by reference) of such known renewable diesel processes include U.S. Pat. No. 7,511,181 to Petri and U.S. Pat. No. 8,912,375 to Egeberg. These processes involve the use of a biological feedstock which is subsequently reacted to produce renewable diesel through competing reaction mechanisms of hydrogenation and decarboxylation. Both reaction mechanisms for renewable diesel produce propane, while decarboxylation also generates CO and $CO_2$, thereby generating low-value waste products, and in which the feedstock is pre-treated to remove the catalyst poisons. Additionally, in Petri, the catalyst poisons are removed by ion exchange directly to the feedstock upstream of the hydrogenation/decarboxylation steps.

Another example of renewable diesel is U.S. Pat. No. 7,967,973 to Myllyoja, in which a triglyceride is subjected to a three step process involving ketonization, hydrodeoxygenation, and hydroisomerization. While differing from the Petri and Egeberg processes in several respects, this merely moves the decarboxylation to an earlier step, as the ketonization step still produces carbon dioxide as a waste product.

Still another example is U.S. Pat. No. 8,350,102 to Roberts, in which a hydrolysis reaction coverts the triglyceride to an intermediate free fatty acid (FFA) feedstock and glycerol by product to be dehydrated and then used as a fuel source. However like Myllyoja, the Roberts process simply moves the decarboxylation process, in this case, to a later step where FFAs are catalytically decarboxylated and "cracked" to smaller hydrocarbons in a high-temperature setting.

Still another example is U.S. Pat. No. 10,071,322 to Coppola, in which a single-step high-temperature, high-pressure, high-turbulence hydrolysis reaction is utilized to convert triglycerides into a combination of FFAs and glycerol, which can then be utilized in the production of renewable fuels. However, the yield percentages (and concomitant economic benefits) of both products are limited by the high reaction energy required, with reaction occurring above the 290° C. glycerol decomposition temperature, and the short residence time, and Coppola does not disclose a particular method for converting the FFAs into renewable diesel. Additionally, with boiling points of 361° C. for stearic acid, oleic acid 360° C., linoleic acid 230° C. (all C18 FFAs) and 351° C. for Palmitic acid, the distillation temperatures of greater than 400° C. suggest distillation above atmospheric pressure.

Still another example is US 2021/0047575 to Zarli, in which the traditional prior art hydrolysis reaction is utilized to convert triglycerides into a combination of FFAs and glycerol. The resulting FFAs are separated, then treated using an acid esterification step that enables the elimination of the catalyst poisons in the FFAs directly from the hydrolysis reaction through the aqueous phase discharge stream. This contrasts from the present invention where distillation is first used to extract catalyst poisons and other impurities such as packaging materials from the feedstock stream before applying traditional non-esterification processes to a low-volume recycle stream.

A need therefore exists for a renewable diesel synthesis process which utilizes a pathway in which none of the intermediate products are decarboxylated or otherwise subject to a reaction which liberates carbon, thereby minimizing the production of undesirable waste products. A need also exists for providing more economical yields without feedstock losses incurred by the methods used to pre-treat and eliminate catalyst poisons. A need also exists for a simple process which generates by-products at high efficiency and further improves the economy of the renewable diesel process.

Embodiments of the invention described herein meet this and other needs.

SUMMARY

Broadly speaking, the invention comprises a two-step process utilizing a triglyceride feedstock derived from biological sources. The first step involves hydrolysis of the triglycerides using traditional prior art technology into intermediate feedstocks comprised of free fatty acids (FFA) and glycerol, which constitutes more valuable and less hazardous by-products than either propane or CO2, and which can be separated from the FFA by simple liquid-liquid phase separation (e.g. —decantation) and then purified by simple distillation. The FFA is then further processed in a simple distillation step to produce a stream free of catalyst poisons, other impurities and utilized as feedstock for hydrotreatment in a renewable diesel production process. Catalyst poisons are ultimately removed from the pre-treatment process by utilizing known processes such ion exchange, activated carbon, solvent extraction, centrifugation, chromatography, electrodeionization, zeolites, etc. in a low volume recycle stream. Significantly, by converting the initial triglyceride feedstock to an FFA feedstock, the need to hydrotreat at typical high temperature that promote the decarboxylation reaction is obviated, thereby drastically reducing the production of CO2, and in the process generating a significantly higher proportion of saturated, long chain C14, C16 or C18 hydrocarbons, as opposed to lower carbon content hydrocarbons. Additionally, carbon yield losses in the form of propane are avoided and the more valuable glycerol product is secured.

BRIEF DESCRIPTION OF THE DRAWINGS

In the detailed description of the embodiments, presented below, reference is made to the accompanying drawings.

One or more embodiments are described below with reference to the listed Figures.

DETAILED DESCRIPTIONS OF THE EMBODIMENTS

Before describing selected embodiments of the present disclosure in detail, it is to be understood that the present invention is not limited to the particular embodiments described herein. The disclosure and description herein is illustrative and explanatory of one or more presently preferred embodiments and variations thereof, and it will be appreciated by those skilled in the art that various changes in the design, organization, order of operation, equipment structures and location, methodology, and use of mechanical equivalents may be made without departing from the spirit of the invention.

As well, it should be understood the drawings are intended to illustrate and plainly disclose presently preferred embodiments to one of skill in the art, but are not intended to be manufacturing level drawings or renditions of final products and may include simplified conceptual views as desired for easier and quicker understanding or explanation. As well, the relative size and arrangement of the components may differ from that shown and still operate within the spirit of the invention.

Moreover, it will be understood that various directions such as "upper," "lower," "bottom," "top," "right," and so forth are made only with respect to explanation in conjunction with the drawings, and that the components may be oriented differently, for instance, during transportation and manufacturing as well as operation. Because many varying and different embodiments may be made within the scope of the concept(s) herein taught, and because many modifications may be made in the embodiments described herein, it is to be understood that the details herein are to be interpreted as illustrative and non-limiting.

Figure 1:
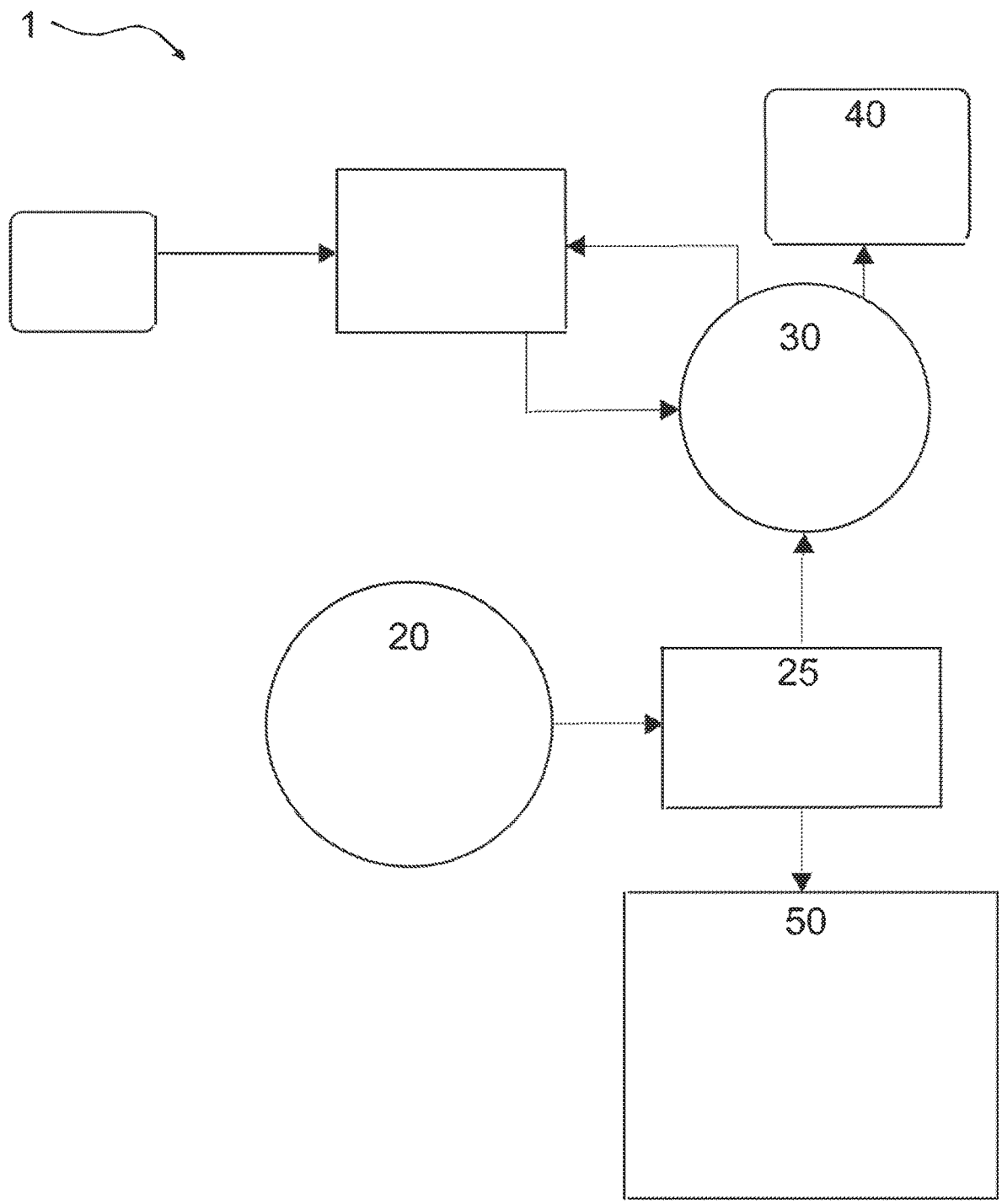
FIG. 1 depicts a standard renewable diesel synthesis process according to the prior art.

Tuning first to FIG. 1, a flowchart depicting a typical renewable diesel process 1 is shown. The initial feedstock of triglycerides 20, derived from animal fat or vegetable oil, is pre-treated 25 with a bleaching clay to remove the catalyst poisons with a portion of the triglyceride (2-5%) lost as waste 50, followed by a renewable diesel process 30. The renewable diesel process utilizes a combination of hydrogenation and decarboxylation along with isomerization and refining, which yields renewable diesel and naphtha 40 as well as propane, CO2, and other gas/vapor waste products. In addition to CO2, the decarboxylation also results in shorter-chain hydrocarbons in the final product due to the loss of carbon during the generation of CO and CO2.

Figure 2:
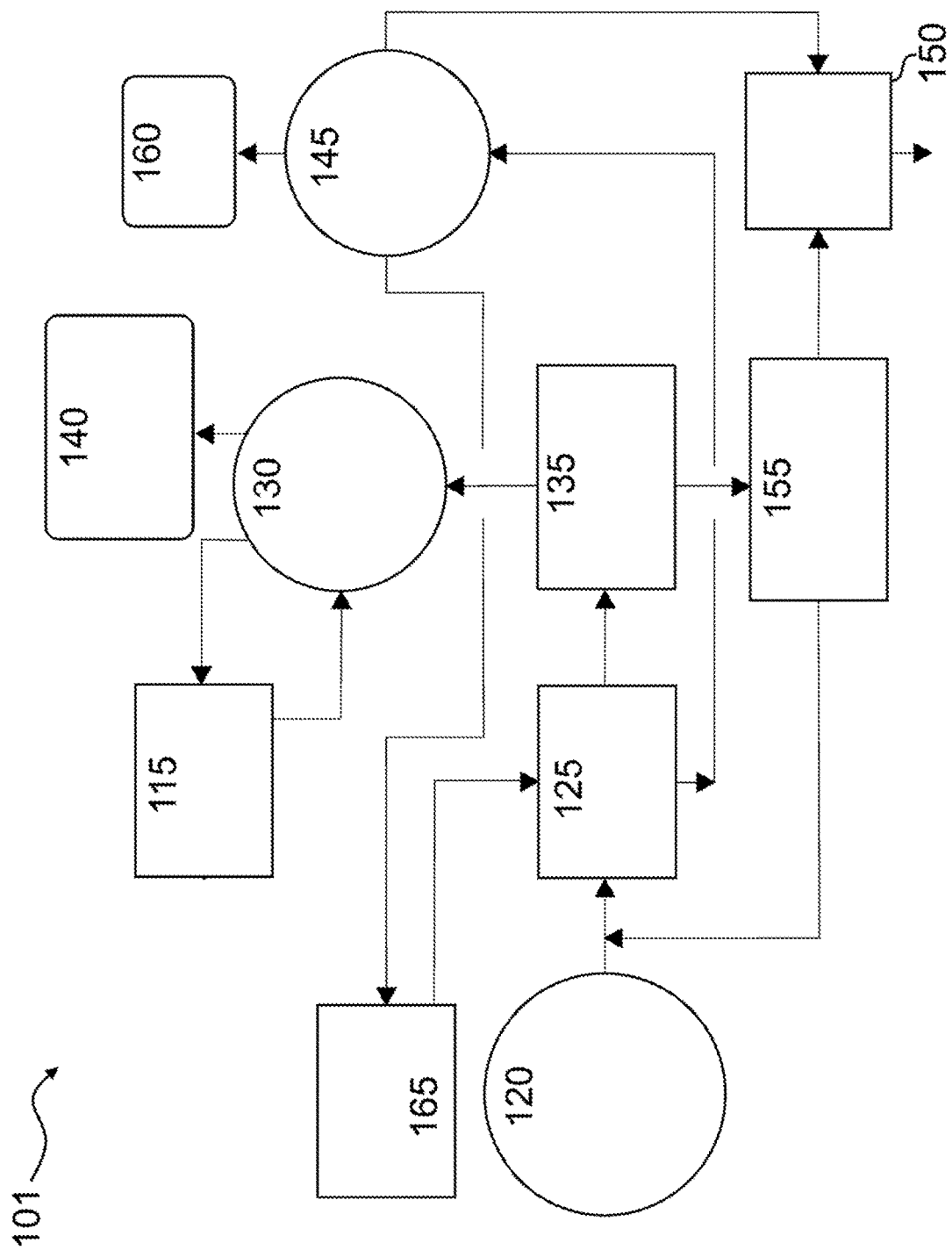
FIG. 2 depicts a high-level embodiment of the novel process disclosed herein.

Turning to FIG. 2, an embodiment of the inventive renewable diesel process 101 is depicted. The first step is a hydrolysis reaction 125 which utilizes only the triglyceride itself 120 and up to 50% of water 165. A counter-current flow of triglyceride is introduced at the bottom of a pressurized water tank under "sub-critical conditions", with a residence time of at least an hour. Pressure may be maintained between 700-900 psig and temperature between 250-270° C. (i.e., below the decomposition point of glycerol). The resulting hydrolysis reaction cleanly separates the glycerol and water mixture from the fatty acid chains.

Advantageously, this counter-current hydrolysis process results in most (50-60%) of the common catalyst poison being dissolved into the water and glycerol mixture. Utilizing simple distillation at under 700 mm Hg of the FFA coming out of the hydrolysis process to generate an FFA distillate free of catalyst poisons, the expensive pre-treatment process is rendered unnecessary while providing similar downstream benefits in the form of lower hydrotreating temperatures with the effect of reduced catalyst fouling.

Additionally, the subcritical reaction and resulting immiscibility of the FFAs with the aqueous solution of glycerol and a large portion of catalyst poisons and impurities which permits the resulting products to be easily and quickly separated via decanting, skimming, or any other suitable physical process known in the art 135. The aqueous fraction of the product can thereafter be subjected to simple distillation to separate it from the water and catalyst poisons.

The bottoms from the distillation of the FFA form a low volume recycle stream (5-15% of FFA distillate) containing triglyceride, diglyceride, monoglyceride, FFA and the remaining catalyst poisons. The remaining catalyst poison 150 are extracted from the recycle stream 155 through utilization of known processes such as ion exchange (depicted), activated carbon, solvent extraction, centrifugation, chromatography, electrodeionization, zeolites, etc., in a relatively small scale step while enabling the complete recycle of triglyceride and FFA back to the stream fed to the bottom of the hydrolysis reactor for high conversion of the triglyceride feedstock to renewable diesel.

In particular, the subcritical conditions and long residence time of the hydrolysis step result in extremely efficient conversions: the FFA conversion is above 95% of theoretical and the glycerol conversion is above 95% of theoretical. This has several key advantages: the high FFA conversions improve throughput in subsequent production steps, while the glycerol is itself a valuable by-product, and the non-toxicity status of the glycerol by-product stream means that disposal concerns are limited to small concentrations of catalyst poisons (e.g. —sulfur, nitrogen, phosphorous and metals) present in the aqueous glycerol solution; this enables water and glycerol—both components later distilled overhead in multiple steps within the glycerol refining section 145—to be recycled back into the hydrolysis reactor 125 via a treatment stage 165 and isolated as a product 160, respectively.

Subsequent to the hydrolysis step 125, and separation of the aqueous glycerol solution and distillation of the FFA 135, the resulting high-purity FFA intermediate feedstock is then subjected to a hydrotreatment reaction 130 utilizing a metallic catalyst (generally a mixture of molybdenum with aluminum, nickel, or cobalt) and hydrogen stream 115 to produce the final product of renewable diesel and naphtha 140. In contrast with conventional hydrotreatment of triglycerides, the FFA feedstock produced by the hydrolysis process allows the use of a higher-pressure (300-1000 psig), lower-temperature (200° C.–350° C.) hydrogenation reaction 130 with a reduction of the decarboxylation reaction relative to the hydrogenation reaction. The partial pressure of the hydrogen is in the range of 150 psig to 800 psig, and the overall liquid hourly space velocity is between 0.5 $hr^{-1}$ to 2 $hr^{-1}$0.1

Advantageously, by eschewing competing decarboxylation reaction in favor of a liquid-phases catalytic hydrogenation, the hydrotreatment leads to an increased yield of long-chain, saturated hydrocarbons (e.g. —more $C_{18}$ paraffins relative to $C_{17}$) as the FFAs retain the carbon of the carboxyl group as opposed to splitting it into C1 or CO2. For example, the step of hydrotreating the purified intermediate feedstock may produce a combined carbon dioxide yield of not more than 80% of a combined carbon dioxide yield as would be produced in a hydrotreating step when feeding a triglyceride feed stock that was pretreated with bleaching earth into the same hydrotreater equipment. Also, for example, the renewable diesel product may comprise at least 20%, more even even numbered straight-chain alkanes of length C14 or greater than would be present in a product produced when feeding a triglyceride feedstock that was pretreated with bleaching earth into the same hydrotreater equipment, The conversion of more than 95% of the triglyceride to FFAs also substantially reduces the production of propane and other low-value, short-chain hydrocarbons, which reduces the size—and therefore cost—of equipment necessary to separate and dispose of them. For example, the reaction chamber of the hydrotreater may be smaller in size than a reaction chamber as would be required when feeding triglyceride feedstock pretreated with bleaching earth.

Still further, the combination of lack of catalyst poisons due to the initial hydrolysis step and subsequent FFA distillation plus the reduced reaction temperatures during hydrotreatment enables less catalyst coking and fouling. In an embodiment, the intermediate FFA feedstock comprises less than 2 parts per million by weight ("ppmw") phosphorous, 20 ppmw sulfur and 30 ppmw nitrogen.

In addition to the economic benefits listed above, the FFA feedstock enables substantially lower (in the range of 15—25%) hydrogen consumption despite the high partial pressure. For example, the hydrogen stream may comprise a throughput volume of not more than 80% of a hydrogen throughput volume as would be consumed when feeding a triglyceride feedstock that was pretreated with earth into the same hydrotreater equipment, for example, with the same catalyst at the same temperature and pressure. As $H_2$ production equipment represents a significant contributor to the capital and operating expense of most renewable diesel production processes, this enables significant operational flexibility compared to prior art renewable diesel processes, as the process can be optimized either for maximum economy (e.g. —lower capital and operating expense) or maximum hydrocarbon production capacity. The use of an FFA feedstock also enables the hydrotreatment step to be accomplished with standard hydrotreatment equipment, e.g., a catalytic hydrogenation reactor, catalytic isomerization reactor, and fractionation and refining equipment.

Figure 3:
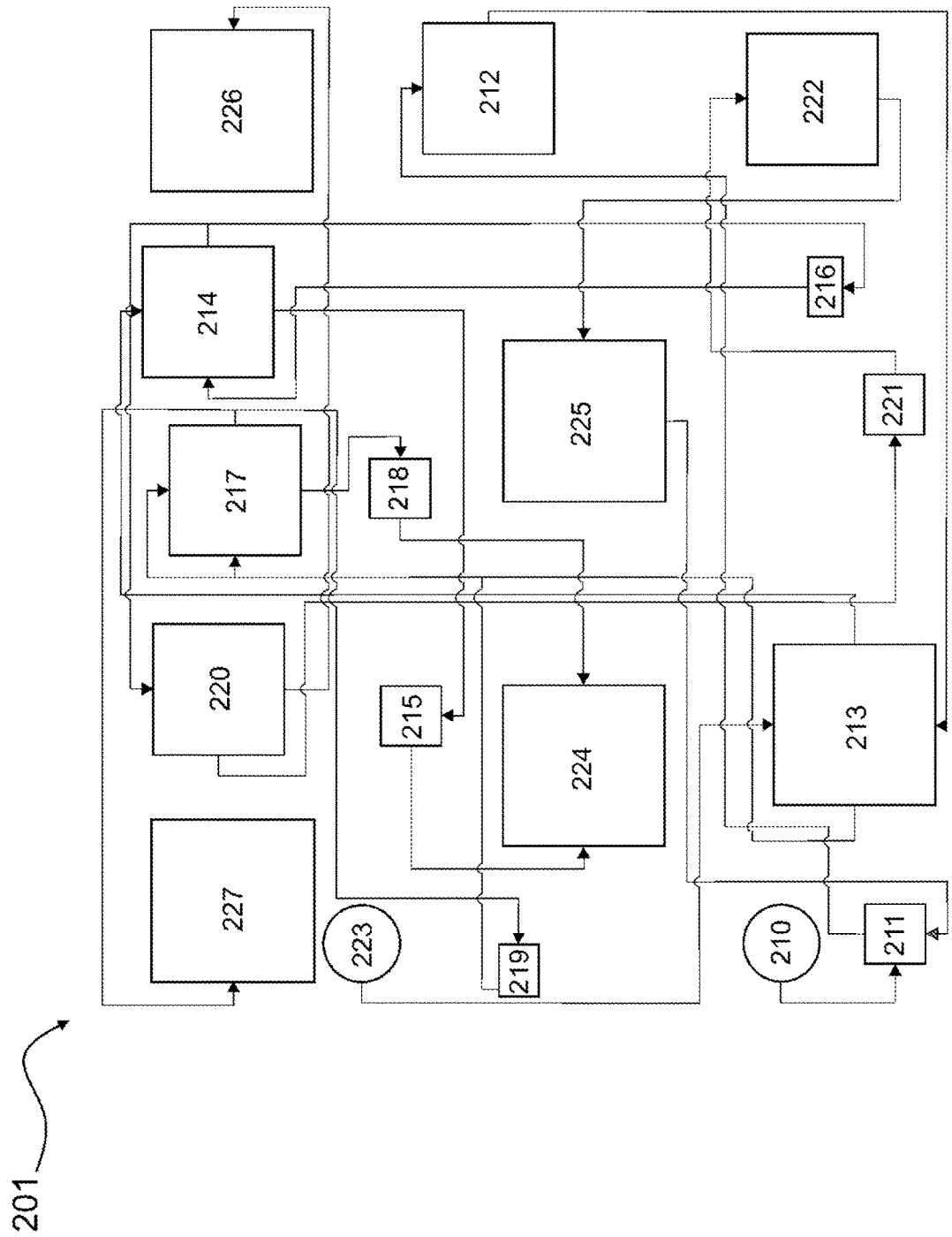
FIG. 3 depicts another, more detailed embodiment of the novel process disclosed herein.

Turning to FIG. 3, an alternative embodiment of the invention 201 is illustrated with the various flow paths in greater detail. Tallow feed 210 goes to the preheater 211, and then flash distillation 212, and then the hydrolysis reactor 213 which is provided hydrogen and hydroxy groups via RO water 223 (although not depicted in this embodiment, the water may also be recycled from storage 224 similar to the embodiment of FIG. 2). The hydrolysis reactor 213 feeds the aqueous phase into the sweet water flash distiller 217 and the FFAs into the FFA flash distiller 214.

The sweet water flash distiller 217 further distills the glycerol which is taken to storage 227 while the water stream is recycled through a condenser 218 and taken to water storage 224. The sweet water cycle is additionally fed through a heater 219.

The FFA flash distiller 214 (also cycled through heater 216) in turn generates a feed of wastewater which is fed to a condenser 215 and into process water storage 224. A second feed from FFA flash distiller 214 is conveyed to fractionation 220. Fractionation 220 in turn generates a bottom recycle stream of pitch which is conveyed to flash distiller 222 via heater 221 and then to pitch storage 225, where it may be optionally recycled into the tallow feed via preheater 211. The top stream of the fractionation 220 is the final FFA product 226, which is the feedstock to the renewable diesel process.

Although several preferred embodiments of the invention have been illustrated in the accompanying drawings and described in the foregoing specification, it will be understood by those of skill in the art that additional embodiments, modifications and alterations may be constructed from the invention principles disclosed herein, while still falling within the scope of the disclosed invention. For instance, the embodiment of FIG. 2 may be practiced with the heaters of FIG. 3, or the embodiment of FIG. 3 without, or the heaters may be located at different points within the fluid streams of the embodiments, etc.

The invention claimed is:
1. A method for producing renewable diesel comprising:
introducing a primary feedstock and up to 50% water into a first reaction chamber under counter-current flow conditions, wherein the primary feedstock comprises biologically-derived triglycerides and catalyst poisons,
hydrolyzing the primary feedstock within the first reaction chamber for at least an hour to form a hydrolysis effluent comprising (i) an aqueous solution comprising glycerol and catalyst poisons and (ii) an intermediate feedstock comprising free fatty acids and catalyst poisons, wherein the first reaction chamber is maintained at a temperature between 250° C. and 270° C. and a pressure between 700 psig and 900 psig;
decanting the hydrolysis effluent to obtain the intermediate feedstock and conveying said intermediate feedstock to a distillation column;
distilling the intermediate feedstock at an absolute pressure under 700 mm Hg to obtain a purified intermediate feedstock containing free fatty acids and a bottom stream containing unreacted triglycerides, diglyceride, monoglyceride, free fatty acids, and catalyst poisons;

hydrotreating the purified intermediate feedstock in a second reaction chamber comprising a metallic catalyst bed and hydrogen, to produce a renewable diesel product comprising C10-C18 alkanes, wherein the hydrotreating is carried out at a temperature between 200° C. and 350° C. and a pressure between 300 and 1000 psig;

removing the catalyst poisons from the bottom stream to form a recycle stream containing unreacted triglycerides, diglyceride, monoglyceride, and free fatty acids; and returning the recycle stream to the first reaction chamber.

2. The method of claim 1, further comprising;

the aqueous solution into a glycerol stream and water; and recycling the water back into the first reaction chamber.

3. The method of claim 1, wherein the metallic catalyst comprises molybdenum, aluminum, nickel, cobalt, a or combination thereof.

4. The method of claim 1, wherein the step of hydrolyzing the primary feedstock produces a glycerol yield at least 95% of theoretical.

5. The method of claim 1, wherein the step of hydrotreating the purified intermediate feedstock produces a combined carbon dioxide yield of no more than 80% of a combined carbon dioxide yield as would be produced in the same hydrotreating step using the same hydrotreater equipment except with a triglyceride feed that was pretreated with bleaching earth.

6. The method of claim 1, wherein the hydrogen stream comprises a throughput volume of no more than 80% of a hydrogen throughput volume as would be consumed in the same hydrotreating step using the same hydrotreater equipment except with a triglyceride feedstock that was pretreated with bleach earth.

7. The method of claim 1, wherein the intermediate feedstock comprises less than 2 parts per million by weight ("ppmw") phosphorous, 20 ppmw sulfur and 30 ppmw nitrogen.

8. The method of claim 1, wherein the renewable diesel product comprises at least 20% more even numbered straight-chain alkanes of length C14 or greater than would be present in a product produced in the same hydrotreating step using the same hydrotreater equipment except with a triglyceride feedstock that was pretreated with bleaching earth.

9. The method of claim 1, wherein the second reaction chamber is smaller in size than a reaction chamber as would be required to operate the same hydrotreating step except with a triglyceride feedstock pretreated with bleaching earth.

10. The method of claim 1, wherein the hydrotreatment reaction is carried out a temperature less than 350°.

11. The method of claim 1, wherein removing the catalyst poisons from fewer bottom stream comprises subjecting the bottom stream to an ion exchange-based purification process, an activated carbon-based purification process, a solvent extraction process, centrifugation, chromatography, electrodeionization, a zeolite-based purification process, or combinations thereof.

* * * * *